Aug. 18, 1936.   J. R. T. CRAINE   2,051,592
ELECTROLYTIC DEVICE
Filed March 30, 1935

Inventor:
John R. T. Craine,
by Harry E. Dunham
His Attorney.

Patented Aug. 18, 1936

2,051,592

UNITED STATES PATENT OFFICE 2,051,592

ELECTROLYTIC DEVICE

John R. T. Craine, Pittsfield, Mass., assignor to General Electric Company, a corporation of New York Application March 30, 1935, Serial No. 13,881

5 Claims. (Cl. 175—315)

The present invention relates to electrolytic devices commonly known as being of the "dry type", which however ordinarily contain a minor proportion of water. It is desirable that the electrolyte in these devices shall be of a viscous character and shall be resistant to drying out during storage or use.

It is the object of my invention to produce capacitors or similar electrolytic devices of this type which are less subject to drying or other physical deterioration even when subjected to somewhat elevated temperatures.

It has been suggested heretofore to provide in electrolytic devices containing electrodes of tantalum and electrolyte of jelly-like consistency composed of sodium silicate and sulphuric acid. Such an electrolyte is not suitable for use in electrolytic capacitors containing electrodes of a film-forming metal such as aluminum.

Electrolytic devices embodying my present invention, while also containing a silicate of an alkali metal modified by an acid, differ in various respects from devices containing such a silicate and sulphuric acid, mainly by containing an alkali metal silicate modified by treatment with a weak acid, such as boric, tartaric, or oxalic acids, and furthermore by containing an excess of such acid.

Figure 1:
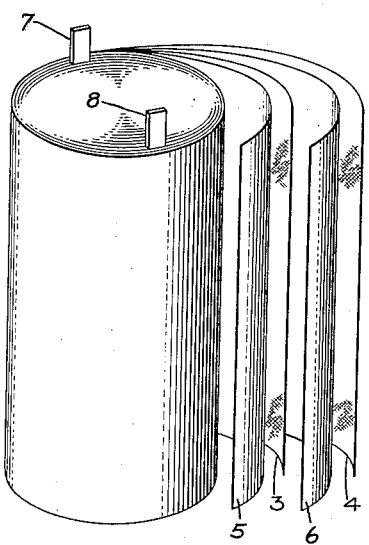
Figure 2:
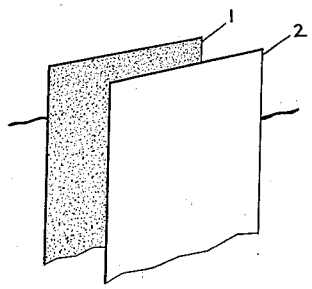

The accompanying drawing shows in Fig. 1 the roll-type of capacitor and Fig. 2 a stacked type of capacitor to each of which my invention is applicable.

In carrying out my invention a suitable silicate of alkali metal, as for example sodium silicate, in which the proportion of $Na_2O$ to $SiO_2$ is in the ratio of 1 to 3.36 is treated with the chosen weak acid which preferably is boric acid, as above stated. Preferably the silicate is first diluted with water. By weight 70.5 grams of such a silicate having a specific gravity of 1.41 may be diluted with 100 grams of water, the proportion being equivalent to equal parts of silicate and water by volume. To the diluted product a small amount of boric acid is added in solution. For example, 5 grams of boric acid are dissolved in 100 grams of water (a substantially saturated solution), and this solution is added to the silicate while stirring. The boric acid neutralizes the free alkali in the silicate and causes decomposition of the silicate with the formation of gelatinous silicic acid and the result is that the mixture assumes the character of a gel. An additional 25 grams of solid boric acid in the finely divided state is added to the gel, care being exercised to secure uniform distribution by sufficient agitation.

The resulting product which contains uncombined, finely divided, solid boric acid may be spread directly on strips of film-forming material such as the strips 1 and 2 indicated in Fig. 2 or may be spread on and introduced into the interstices of interleaved separators, or spacers, of porous open-work fabric, such as cheesecloth, as indicated at 3 and 4 in Fig. 1. The semi-solid mixture has such consistency that it may be spread as a layer on the armatures at approximately room temperature which is a decided advantage. The electrodes 5 and 6 of Fig. 1 assume strip form, so as to be suitable for rolling as indicated. Preferably the electrodes in either case are previously subjected to electrolytic treatment to form a current-blocking film of oxide or hydroxide thereon in accordance with well known practice.

In place of the ingredient of solid boric acid, other solid ionogens preferably in the finely divided state may be added to give desired conductivity and specific conductive capacity to the completed capacitor. For example, in place of finely divided boric acid an insoluble, finely divided, crystalline material, such as titanium dioxide, may be suspended in the gel. In some cases a hydroxy fatty acid, such as alpha hydroxy isobutyric acid, may be added in small amounts, say, one per cent or less, for the purpose of increasing ionization. A finely divided filler such as clay also may be added to the gel.

I intend in the appended claims to cover by the term "boric acid" also the hereindescribed and other weak acid equivalents for boric acid which are suitable for use in combination with silica gel for the purposes of my invention.

What I claim as new and desire to secure by Letters Patent of the United States is:

1. An electrolytic device containing cooperating aluminum electrodes and a body of silicic acid gel located therebetween, said gel containing finely divided, solid boric acid.

2. An electrolytic device containing cooperating aluminum electrodes and a body of water-containing silicic acid gel located therebetween, said gel containing an excess of uncombined, solid boric acid distributed therethrough.

3. An electrolytic capacitor comprising aluminum foil armatures spaced closely adjacent one another and a layer of silicic acid gel therebetween, said gel containing a chemical excess of boric acid.

4. An electrolytic capacitor comprising closely spaced aluminum armatures and a layer of silicic gel therebetween, said gel containing finely divided solid boric acid and upwards to about one per cent of a hydroxy fatty acid.

5. An electrolytic capacitor comprising closely spaced aluminum armatures and a layer of semi-solid material therebetween comprising a silicic acid gel, finely divided boric acid and a finely divided inert material.

JOHN R. T. CRAINE.